United States Patent [19]

Elmqvist

[11] 4,072,959

[45] Feb. 7, 1978

[54] RECORDER OPERATING WITH DROPS OF LIQUID

[75] Inventor: Rune Elmqvist, Bromma, Sweden

[73] Assignee: Siemens Aktiengesellschaft, Berlin & Munich, Germany

[21] Appl. No.: 681,525

[22] Filed: Apr. 29, 1976

[30] Foreign Application Priority Data

June 20, 1975 Germany .............................. 2527647

[51] Int. Cl.[2] ......................... G01D 15/18; H01V 7/00

[52] U.S. Cl. ................................. 346/140 R; 310/330

[58] Field of Search .................... 346/140; 310/8.6, 8.5

[56] References Cited

U.S. PATENT DOCUMENTS 3,418,427 12/1963 Jones ............................ 346/140 UX 3,452,360 6/1969 Williamson .......................... 346/140

FOREIGN PATENT DOCUMENTS 2,045,108 3/1972 Germany ............................. 310/8.6

*Primary Examiner*—George H. Miller, Jr.

*Attorney, Agent, or Firm*—Hill, Gross, Simpson, Van Santen, Steadman, Chiara & Simpson

[57] ABSTRACT

A recorder operating with drops of liquid for point-by-point recording of analog curves or alphanumerical characters and of images. Nozzles are arranged in rows for producing the individual points. In front of inlet openings of the nozzles, contacted piezoelectric transducers are arranged so that as a result of electrical potential variation at the contact, ink is expelled from the nozzle. Recording means is located in front of the exit opening of the nozzles, and the transducers are in the form of rod-shaped elements for producing the piezoelectric movements. The transducers are arranged in the form of teeth of a comb, with the free end zone of the rods assigned to one respective inlet opening of each of the nozzles. The rods, with their free front areas, are arranged in front of the inlet openings of the nozzles so that the lengthwise axes of the rods and the lengthwise axes of the nozzles are aligned with the contact on the rods. In this manner, potential variations on the contacts cause a change in the length of the rods.

8 Claims, 9 Drawing Figures

RECORDER OPERATING WITH DROPS OF LIQUID

BACKGROUND OF THE INVENTION

The present invention relates to a recorder operating with drops of liquid for point-by-point recording of analog curves or alphanumeric characters and of images, in which nozzles are arranged in rows for producing the individual points. The nozzles have in front of inlet openings, contacted piezoelectric transducers arranged in such a way that as a result of electrical potential variations at the contacts, ink is expelled from the nozzle and applied to recording means located in front of the exit opening of the nozzles.

A recorder of the preceding species is known from U.S. Pat. No. 3,211,088. This patent document also describes how the distance between the nozzles arranged in one row can be varied in order to obtain greater recording intensity. It has been proposed that the intake areas of the exponentially-shaped nozzles be staggered. But even with staggered arrangement of the nozzle inlet openings, the space between the nozzles cannot be made smaller than the physical dimension of the individual piezoelectric transducers. When using individual block-shaped transducers or individual thick disk transducers, they must have a relatively large area in order to achieve sufficient deflections of the front surfaces of the transducers. This results in a relatively large distance of the individual nozzles from each other. Furthermore, the mounting of the individual oscillators becomes difficult, especially when narrow nozzle intervals must be maintained and the transducers are staggered.

It is, therefore, an object of the present invention to provide for a device of the initially described type through which sufficiently large drive movements for the ejection of ink can be achieved and which, nevertheless, provide the possiblity of very close spacing between the nozzles.

Another object of the present invention is to provide a device of the foregoing character which may be economically fabricated and maintained in service.

A further object of the present invention is to provide an arrangement which is simple in construction and has a substantially long operating life.

SUMMARY OF THE INVENTION

The objects of the present invention are achieved by providing that to generate the piezoelectric movements, rod-shaped piezoelectric transducers are arranged in the form of the teeth of a comb, with the free end zone of the rods being associated with one inlet opening of each of the nozzles.

As a result of the construction in accordance with the present invention, and because of the lengthwise extent of the rods, sufficiently large impact amplitudes can be achieved with relatively small cross sections, so that a particularly close arrangement of the nozzles can be achieved due to their small cross-section. Because of the available large impact amplitudes, the nozzles need not be exponentially or horn-shaped. This avoids the relatively large inlet cross-sections which otherwise would prevent the close spacing of the nozzles.

In addition, the rods can be mounted on their ends facing away from the nozzles with great facility, by using a comb-like arrangement. With a staggered arrangement — which is obviated by the present invention — this comb-like and easy to manufacture arrangement would not be possible.

Arranging the rods in the lengthwise direction of the nozzle opening has the advantage that the entire assembly can be accommodated in a simple and very flat container which is easy to manufacture.

It is advantageous to turn the rods into flexural vibrators because then the free ends of the rods have greater vibration amplitudes (impact amplitudes), so that an even smaller inlet cross-section from the nozzles can be used, then when using rods impacting in the lengthwise direction. This facilitates an even closer arrangement of the nozzles next to each other. It has been found from practical experience that flexural vibrators are less likely to break than lengthwise impacting rods and that greater safety of operation and reliability can thereby be achieved.

Particularly reliable were found to be bilaminar flexural vibrators in which piezoceramics is combined with metal which has the same thermal expansion coefficient as the piezoceramic material.

Manufacturing of the rods and their mounting are particularly simple if the rods are made with parallel slitting by sawing from one piece, leaving a base in the fashion of a comb. This base serves as solid support for the rods. Combs produced in this manner offer the possibility of simply contacting one side (end) of all rods.

With the rods being held on both ends and the nozzles located in the mid-region of the rod, particularly large mechanical stability is obtained.

In an actual embodiment, a nozzle spacing (center-to-center) of less than 0.3 mm with a nozzle inlet opening diameter of 0.15 mm could be achieved. The rod length was 8 mm and the highest drop frequency per nozzle was 3000/second. With shorter rod lengths, higher frequencies can be achieved.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings.

DESCRIPTION OF THE PREFERRED EMBODIMENTS

Figure 1:
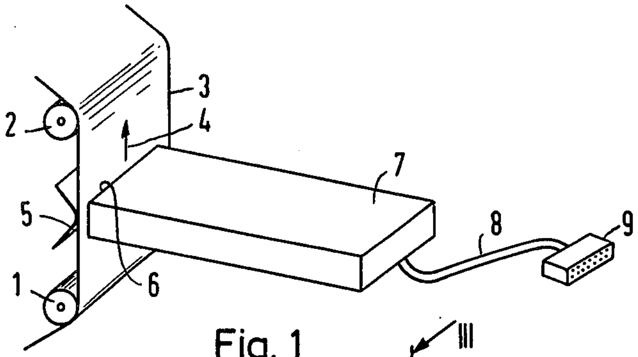
FIG. 1 shows a schematic view of the recorder.
Figure 2:
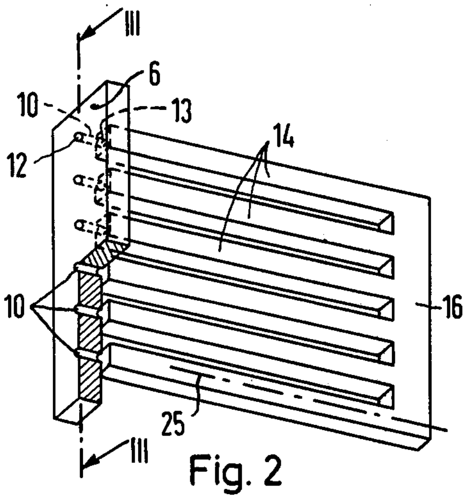
FIG. 2 shows a comb of piezoelectric material with the associated exit nozzles for ink, part of which is a section and part of which is an ordinary view.
Figure 3:
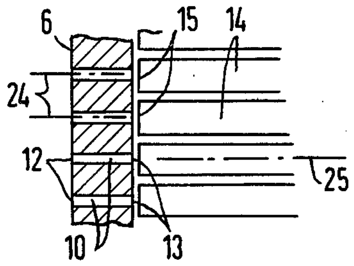
FIG. 3 shows a section taken along line III—III of FIG. 2.
Figure 6:
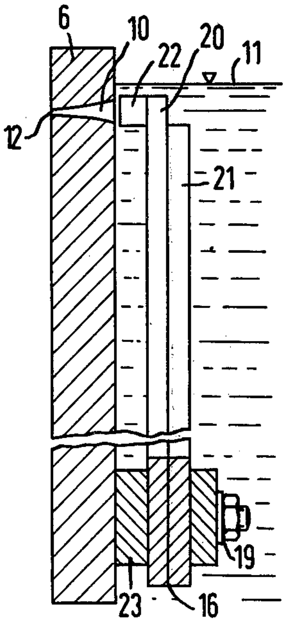
FIG. 6 shows a variation of the embodiment of FIG. 4.
Figure 7:
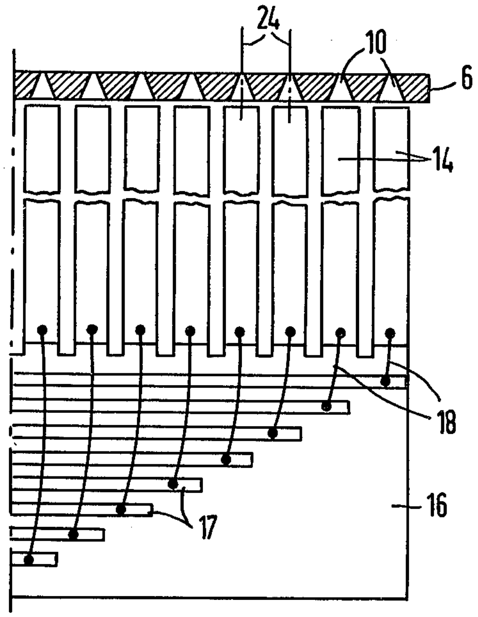
FIG. 7 shows a contacting example of a comb of the type in FIG. 2.
Figure 9:
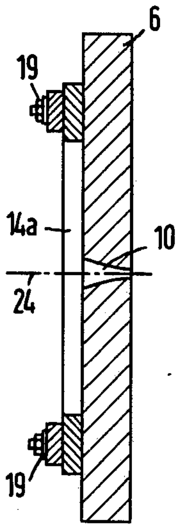
FIG. 9 shows a side view of the variation of FIG. 8.

FIG. 1 shows the external construction of the device. Via transport rollers 1 and 2, the recording means in the form of, for example, standard recording paper 3 is pulled in the direction of arrow 4 over the spacer 5 past the front side 6 of housing 7. In housisng 7, there is inserted connecting line 8, which on its free end mounts a plug 9 for connecting to a suitable control device which provides the control signals for recording the desired curves, symbols or images. The front side 6 of housing 7, whose lengthwise dimensions of FIG. 1 is horizontal and in FIG. 2 (for better viewing), is vertical, contains a row of holes 10 with diameter of about 0.15 mm (it may be smaller), and which serve as nozzles for the ink 11 (FIG. 6) contained in the housing. The paper side opening of the holes is denoted by 12 and the ink side opening by 13. Besides the ink 11, which should be electrically non-conducting, the housing 7 comprises rods 14 of piezoelectric material. These are mounted in such a way that upon application of suitable electrical control, ink in the shape of droplets, squirts from the nozzle. In the embodiment of FIG. 2 (and FIG. 3), the cross-section of the rods is rectangular; they are arranged parallel to one another like the teeth of a comb, with the free front side 15 of each tooth 14 being assigned to a hole 10. The assignment is made such that the hole's lengthwise direction and the lengthwise direction of the assigned tooth coincide. The distance of front side 15 from the ink side opening 13 of the associated hole 10 is lss than approximately 0.1 mm. The teeth ends facing away from the holes become the base 16 of the comb. This comb base can be made so wide that the electrical lines to the contacts with the individual teeth may be placed on the comb base in the conventional or printed form. In FIG. 7, the printed lines are denoted by 17 and the connecting lines to the contacts areas on the teeth are denoted by 18.

Figure 4:
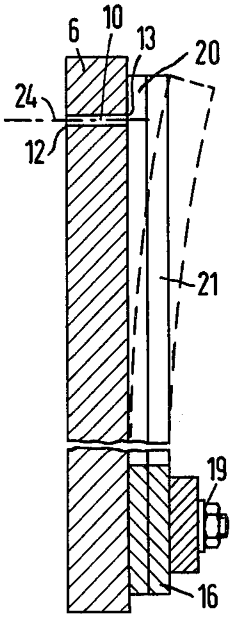
FIG. 4 shows a side view of a piezoelectric rod, operating as a flexural vibrator.
Figure 5:
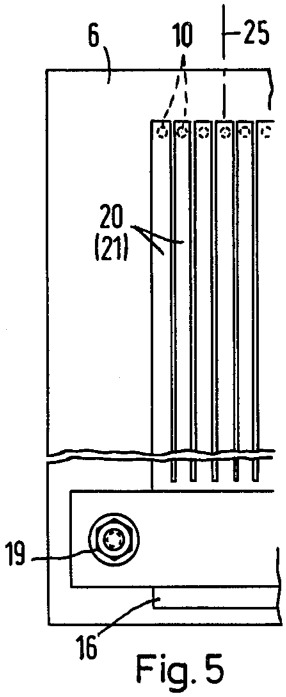
FIG. 5 shows a top view of a piezoelectric comb with rods, in accordance with FIG. 4.

The contacts of the teeth are arranged so that the bottom (not visible) area of the comb (in FIG. 7) has a common contacting area, while the opposite (visible area) is contacted individually. When applying an electrical potential to the two contact sides of one tooth, this tooth is set into a piezoelectric motion (variation of length), which, in the embodiments of FIGS. 2,3, and 7, lead to impact amplitudes to expel ink from the nozzles. In the embodiments of FIGS. 4,5,6, and 8, on the other hand, flexural vibrations are generated. For this reason, the piezoelectric comb comprising teeth 14 and comb base 16, is parallel to the plane of front side 6 of housing 7 (position and shape of the housing, accordingly are different from that shown in FIG. 1). The free end zone of the individual rods or teeth 14 is again located in front of the individual holes of the row of holes, but not in the lengthwise direction of the rods, but transversely thereto. Base 16 is screwed into housing front side 6, which holds the row of holes by means of mounting screw set 19. When applying electrical potential to the contacts of a rod, the rod moves to the position shown by the broken lines in FIG. 4; if the applied potential is briefly interrupted, it snaps back to the unbent position (shown by solid lines) and thereby squeezes a drop of ink through nozzle 10. The flexural vibrators used here are bilaminar, with metal and piezoceramics (with approximately the same thermal expansion coefficients) being combined. In FIGS. 4 through 6, the metal portion of the bilaminar vibrator is denoted by 20 and the ceramic portion is denoted by 21. With this arrangement, as shown in FIG. 6, an impact block 22, made of metal (rectangular cross-section with length of side 0.3 mm) to improve the impact characteristic, can be attached in a simple manner. To compensate for the impact block, a spacer 23 is provided between housing front surface 6 and screw mounting 19.

FIGS. 6 and 7 indicate that the holes 10 are cone-shaped so that the cross-section becomes narrower in the direction of the exit opening for the ink.

Figure 8:
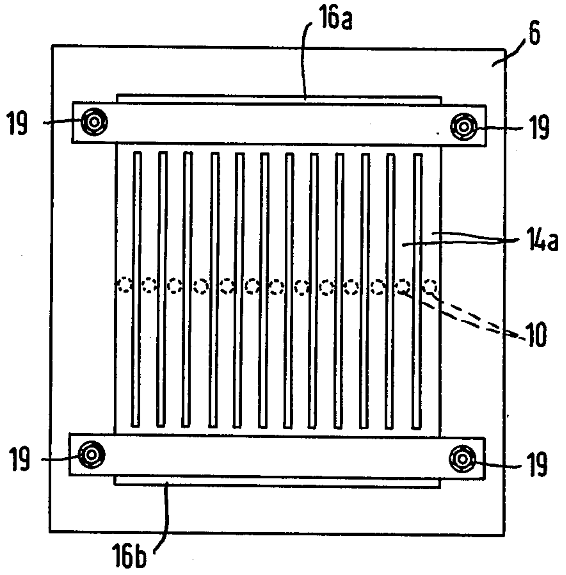
FIG. 8 shows a top view of a variation with piezoelectric double comb.

FIG. 8 shows a design for the rods where the rods 14*a* at their two ends, viewed in the lengthwise direction of the rods, become the base of the comb 16*a*, 16*b*. With potential changes at the electrical contacts, according to FIG. 7, the teeth midway between the two comb bases, perform maximum flexural vibration amplitudes so that at this point nozzles 10 are located in such a way that their lengthwise direction is perpendicular to the plane of the comb in the area of the aforementioned maximum vibration amplitude. It is apparent that with this variation, the shape, position, and arrangement of housing 7 must be different from that shown in FIG. 1.

In the embodiment of FIG. 8, "free end zone of the rods" is the midregion between the two comb bases 16a and 16b (as if the individual teeth were separated midway between the comb bases). The lengthwise axes of holes 10 are denoted by 24 and the lengthwise axes of the rods are denoted by 25.

Without further analysis the foregoing will so fully reveal the gist of the present invention that others can, by applying current knowledge, readily adapt it for various applicatons without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A recorder operating with drops of liquid for point-by-point recording of analog curves or alphanumerical characters and of images, comprising in combination, a plurality of nozzles positioned next to one another in rows in a common member for producing the individual points, said nozzles having inlet openings and exit openings contacted piezoelectric transducer positioned in front of said inlet openings and arranged so that as a result of electrical potential variations at the contacts, ink is expelled from the nozzle; recording means to which the expelled ink is applied located in front of the exit openings of the nozzles; said transducers comprising rod-shaped piezoelectric transducers for generating piezoelectric movements, said transducers being arranged in the form of teeth of a comb having base ends commonly joined together with unjoined free end zone of each of the rods assigned to the respective inlet opening of each of the nozzles.

2. The recorder as defined in claim 1, wherein said rods have free front ends thereof arranged in front of the inlet openings of said nozzles so that the longitudinal axes of said rods and the longitudinal axes of said nozzles are aligned so that potential variations at the contacts produce a change in length of a rod.

3. The recorder as defined in claim 1, including means for supporting said rods at their two ends, said nozzles being located in the central region of said rods.

4. The recorder as defined in claim 1, including a comb-shaped base connecting at least two adjacent rods at their ends facing away from the nozzles.

5. The recorder as defined in claim 4, wherein said base and said rods are of one piece integral element.

6. The recorder as defined in claim 1, wherein said rods have predetermined shapes and said contacts are arranged so that upon electrical potential variations at the contacts, said rods bend transversely to the longitudinal axes of said rods, said rods being arranged in front of the respective nozzles so that the plane of flexure passes through the longitudinal direction of said nozzles, the longitudinal axes of the individual nozzles intersecting perpendicular the longitudinal axes of the respective rods.

7. The recorder as defined in claim 6, wherein said rods are comprised of bilaminar material.

8. The recorder as defined in claim 7, wherein said bilaminar material is a combination of piezoceramics and metal, the ceramic and the metal having the same thermal expansion coefficient.

* * * * *